US008779891B2

(12) United States Patent
Rosenthal et al.

(10) Patent No.: US 8,779,891 B2
(45) Date of Patent: Jul. 15, 2014

(54) ACCESS CONTROL DEVICE

(75) Inventors: Daniel Rosenthal, Siegen (DE); Martin Rossmann, Huettenberg (DE)

(73) Assignee: Rittal GmbH & Co. KG, Herborn (DE)

(*) Notice: Subject to any disclaimer, the term of this patent is extended or adjusted under 35 U.S.C. 154(b) by 389 days.

(21) Appl. No.: 13/138,453

(22) PCT Filed: Feb. 17, 2010

(86) PCT No.: PCT/EP2010/000979
§ 371 (c)(1), (2), (4) Date: Oct. 7, 2011

(87) PCT Pub. No.: WO2010/097178
PCT Pub. Date: Sep. 2, 2010

(65) Prior Publication Data

US 2012/0019357 A1 Jan. 26, 2012

(30) Foreign Application Priority Data

Feb. 25, 2009 (DE) ......................... 10 2009 010 491

(51) Int. Cl.
*G05B 19/00* (2006.01)
*G05B 1/08* (2006.01)
*G08B 21/00* (2006.01)

(52) U.S. Cl.
USPC ......... 340/5.6; 340/5.61; 340/5.62; 340/5.64; 340/5.7; 340/686.6; 340/539.13

(58) Field of Classification Search
USPC .............. 340/5.61, 5.62, 5.64, 5.66, 5.7–5.82
See application file for complete search history.

(56) References Cited

U.S. PATENT DOCUMENTS 5,815,557 A * 9/1998 Larson ......................... 340/5.64
6,509,654 B2 1/2003 Ciliox et al.
6,748,061 B2 * 6/2004 Ahlstrom et al. ........ 379/102.06
6,943,725 B2 9/2005 Gila et al.

(Continued)

FOREIGN PATENT DOCUMENTS

DE 100 62 466 A1 6/2002
DE 100 62 466 B4 4/2004

(Continued)

*Primary Examiner* — Steven Lim
*Assistant Examiner* — Omeed Alizada
(74) *Attorney, Agent, or Firm* — Marshall & Melhorn, LLC

(57) ABSTRACT

The invention relates to an access control device, in particular for a switchgear cabinet system, having a central unit, which is designed to receive and evaluate access authorization data stored on personal transponders and to output release signals via a wireless signal transmission link and to release a relevant interlocking unit, and which has an authentication device with a testing stage in which comparison data for testing the received access authorization data for access authorization is present. Increased security is achieved in that, in addition, at least one input station having an input unit is present, which is or can be used to establish a wireless data transmission connection to the central unit for the transmission of input data that is different from the access authorization data, the authentication device is designed to operate in two stages and has a further testing stage, which is designed for the direct or indirect allocation of the input data to the access authorization data and to check agreement between the access authorization data and the input data with regard to the access authorization, and the central unit is designed to output the release signals when the access authorization has been established after checking by means of the further testing stage.

9 Claims, 1 Drawing Sheet

(56) References Cited

U.S. PATENT DOCUMENTS

| | | | | |
|---|---|---|---|---|
| 8,437,740 | B2 * | 5/2013 | Despain et al. | 455/410 |
| 2002/0069276 | A1 * | 6/2002 | Hino et al. | 709/223 |
| 2006/0022794 | A1 | 2/2006 | Determan et al. | |
| 2006/0113841 | A1 * | 6/2006 | Dornbach et al. | 307/10.3 |
| 2008/0061931 | A1 * | 3/2008 | Hermann | 340/5.72 |
| 2009/0027159 | A1 | 1/2009 | Bozionek et al. | |
| 2009/0320538 | A1 | 12/2009 | Pellaton | |
| 2010/0305779 | A1 * | 12/2010 | Hassan et al. | 701/2 |

FOREIGN PATENT DOCUMENTS

| | | | |
|---|---|---|---|
| DE | 10 2005 030 204 | A1 | 1/2007 |
| DE | 10 2005 057 101 | A1 | 6/2007 |
| DE | 10 310 158 | B4 | 7/2008 |
| EP | 1 780 680 | A1 | 5/2007 |
| WO | WO 01/52199 | A2 | 7/2001 |
| WO | WO 2004/034334 | A1 | 4/2004 |

* cited by examiner

ACCESS CONTROL DEVICE

BACKGROUND OF THE INVENTION

The invention relates to an access control device, in particular for a switchgear cabinet system, having a central unit which is designed to receive and evaluate access authorization data stored on personal transponders and to output release signals via a wireless signal transmission link and to release a relevant interlocking unit, and which has an authentication device with a testing stage in which comparison data for testing the received access authorisation data for access authorization is present. Further, the invention relates also to a method of access control in particular of a switchgear cabinet.

An access authorization device of this type is shown in WO 01/52199 A. Herein a central units receives access authorization data from an electronic key system, in particular an alphanumeric input device, a chip card, a barcode, a transponder chip, biometric sensors or a cellular phone, and releases the locking mechanism of a interlocking unit after verification and identification of an access authorization, so that the relevant door can be opened by the person who was identified as authorized for access. Indeed, a relative high security level is given for such an access control device, however, manipulation possibilities by which unauthorized persons may get access, are not completely excluded.

DE 100 62 466 B4 discloses an electronic lock for a locking system for example in connection with doors of safety cabinets. To release the lock, also here access authorization data are verified previously. To increase security, the locking means may be connected to a further locking mechanism.

DE 196 09 689 B4 shows a control and monitoring device for various functions of switchgear cabinets, inter alia comprising a door limit switch by which a locking state of the door of a switchgear cabinet can be detected.

SUMMARY OF THE INVENTION

The invention is in based on the objective to provide an access control device and a method for access control, in particular for a switchgear cabinet system, which satisfies increased security demands.

This object is solved with the features of claim 1 or of claim 11, respectively.

It is thereby provided for the access control device that in addition at least one input station having an input unit is present, which is or can be used to establish a wireless data transmission connection to the central unit for the transmission of input data that is different from the access authorization data, the authentication device is designed to operate in two stages and has a further testing stage which is designed for direct or indirect allocation of the input data to the access authorization data and to check agreement between the access authorization data and the input data with regard the access authorization, and the central unit is designed to output the release signals when the access authorization has been established after checking by means of the further testing stage.

In the method for access control according to the preamble part of claim 11 it is furthermore provided that further to access authorization data in addition receipt data are taken by an input station, and involving this data, it is checked whether the access authorization data belong to a person authorized for access and that an authorization status is set only if the access authorization is determined upon evaluation with said receipt data, whereupon said release signal is output.

By these measures, increased security is achieved, because evaluated access authorization data received in the central unit are not immediately used to produce and transmit release signals to the interlocking unit, but the central unit is further designed to receive input data automatically or manually input via the input station by an authorized person and to receive transmitted input data and to additionally verify access authorization data with the input data and only in case of a correct result of the verification recognizes access authorization and sends the release signal to the relevant interlocking unit based on this authorization status. The input unit may be designed e.g. as key input unit, chip reading unit, barcode reading unit, biometric data reading unit or the like, and a corresponding input means for the authorized person is provided therewith. By these measures, very high security demands are satisfied.

To increase security, those measures contribute that the access control device is equipped with a distance measuring device for determining the distance between at least one personal transponder and at least one interlocking unit or at least one input station or input unit and that the central unit is equipped with a decision unit by means of which the release signal can be suppressed until a predetermined minimum distance is fallen below.

A further embodiment by which an increased security is achieved, consists in that it is equipped with a position determination device for determining the position of at least one personal transponder and that the central unit is equipped with a decision stage by means of which the release signal can be suppressed as long as the personal transponder is located outside a predetermined area.

Further increase of security is obtained by configuring the authentification device to check further authorization data of a further personal transponder and by configuring the central unit to output a release signal only if also the further authorization data are recognized to be reliable.

Further measures for a reliable data transmission with the possibility to determine distance data and/or position data, consist in comprising a radio communication system having a network including several receiver and repeater stations.

The locking state of the door can be checked and monitored reliably by disposing a radio transmission/receiver unit in the area of the interlocking unit by which it can be determined whether a door provided with a interlocking unit is in an open or closed state, and this state can be transmitted to the central units. A reliable operation of the interlocking unit with low electric energy demand is achieved by providing the interlocking unit with a manually operable unlocking mechanism, wherein the unlocking function can be set by means of an actor unit responsive to the release signal and/or which allows unlocking by means of mechanical authorization means, in particular keys or the like, independent of the release signal. The mechanical authorization means which itself is safely deposited or given to a priorized person, respectively, allows access e.g. in an emergency situation upon failure of the electronic system.

Thereby various design possibilities consist in that the actor unit can be operated piezoelectrically, electromagnetically or electromechanically, wherein in particular the piezoelectrical operation has turned out to be substantially energy saving.

It is advantageous for energy supply and safe function that an inductive coupling unit is provided which is effective in a closed state of the door, for coupling electric energy from the switchgear cabinet into the interlocking unit disposed at a door, wherein inside the cabinet in the frame, adjacent to the interlocking unit in a closed state, a transformer winding is present which is fed by an energy source, and a load winding is disposed in the interlocking unit.

Further, those measures contribute to a reliable monitoring of the access control and switchgear cabinet system that the central unit is connected to a superordinate monitoring and control unit for data transfer, into which further monitoring functions for monitoring a switchgear cabinet, including air conditioning functions and energy supply functions are integrated.

Further checks and analyses may be performed in the superordinate monitoring and control device, also in connection with monitoring data of other sensors, where applicable involving user specific data and programs and use of storage devices. For example, alarm messages can be issued in this way to remote control rooms or to maintenance staff, when the door is open, and, in case of need, operations can be controlled, such as to create a temporarily increased cooling power or switch off loads which are less important for operation or the like.

BRIEF DESCRIPTION OF THE DRAWINGS

The invention is further explained below with the aid of exemplary embodiments with reference to the drawings. It is shown in.

DETAILED DESCRIPTION OF THE INVENTION

Figure 1:
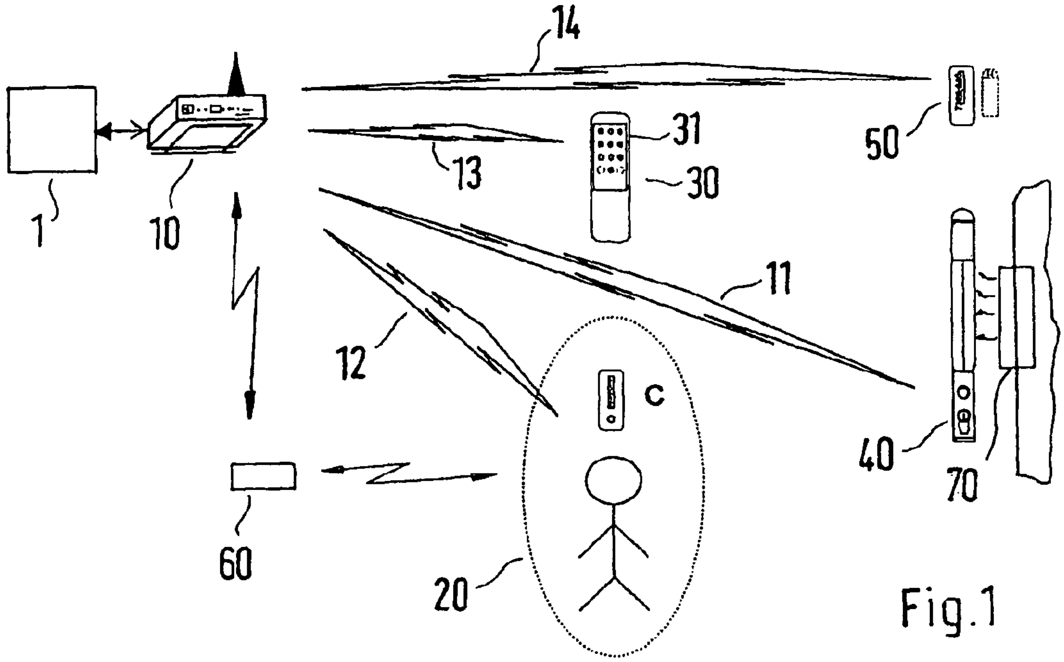
FIG. 1 an access control device for a switchgear cabinet system with essential components in a schematic representation and FIG. 2 a part of a interlocking unit in a perspective detailed representation.

FIG. 1 shows an access control device, for example for a switchgear cabinet system, comprising a central unit 10 which is connected to personal transponders 20 via relevant data transmission path 12, at least one input station 30 via a data transfer link 13, several interlocking units 40 via signal transmission paths 11 as well as to transmitting/receiving units 50 having a state sensor for a relevant door via a signal transmission path 14 wirelessly, in particular via radio signals. Further transmission paths, in particular for longer transmission links, run through receiver and repeater stations 60 whereby weak signals, for example from personal transponders 20, are amplified and transferred to central unit 10 with increased security level and furthermore the possibility exists to make distance determinations or position determinations of persons carrying a relevant personal transponder 20. Further, central station 10 is connected for data transfer to a superordinate control and monitoring device 1 for the switchgear cabinet system and, where applicable, further switchgear cabinets, to perform additional checks and analyses and to issue messages e.g. to a control room and/or to maintenance staff.

Figure 2:
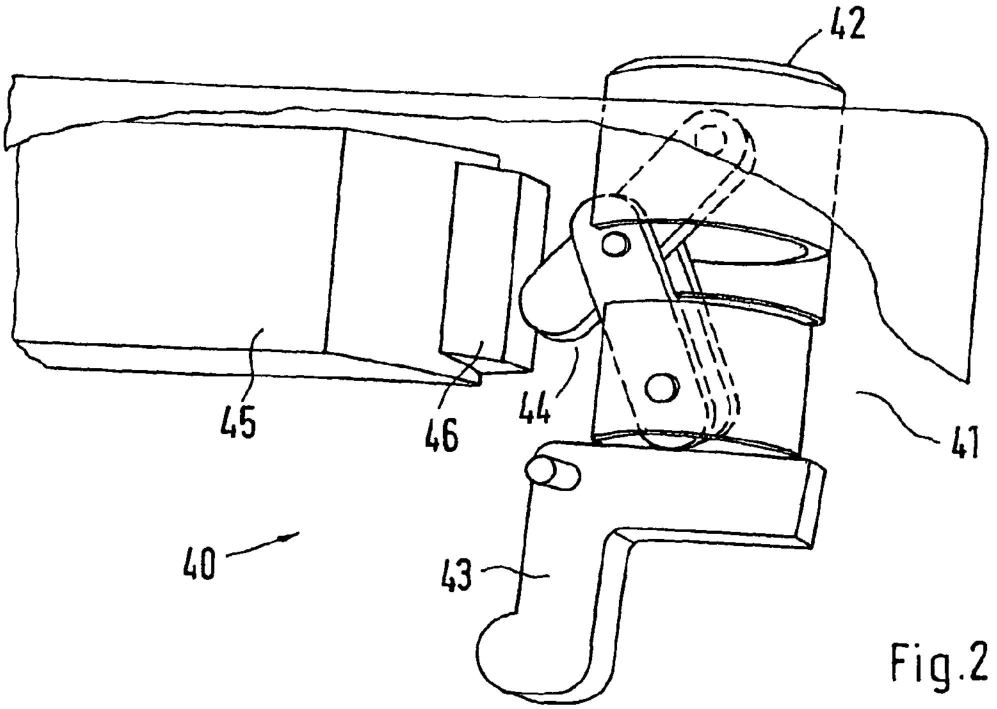

FIG. 2 shows an exemplary embodiment of a release part of interlocking unit 40 having an unlocking mechanism 41 which comprises an actuating element 42 in form of a manual actuating knob for actuating by a user as well as a lever mechanism 44 which acts on an actuating member 43 for unlocking. This member actuates e.g. a pushing rod or a rotating mechanism or pivot mechanism of a lock to open the door. Further, the interlocking unit 40 comprises an actor unit 45 responsive to the release signal issued by central unit 10. To achieve this, actor unit 45 possesses for example a piezoelectrically acting actor element which locks an abutment 46 against moving back in a release state, so that pressure applied manually to actuating element 42 is transferred to actuating member 43 through lever mechanism 44. In a non-released state of the interlocking unit 40, however, abutment 46 is not locked and can easily, e.g. against a small spring force or magnetic force, move back from the position as shown by means of the upper lever of FIG. 2 upon application of pressure to actuating element 42, whereby the actuating pressure of the actuating element 42 results in moving back abutment 46 and actuating member 43 is not moved, so that the locking mechanism of the door cannot be opened. The piezoelectrically operating actor mechanism operates particularly energy saving. Other actor mechanisms are conceivable, e.g. electromagnetically or electromechanically operating mechanisms which can be addressed by the release signal.

Electrical energy needed for electric actuation of actor unit 45 and optionally of further units may be provided by means of a battery, since cable connections between door and switchgear cabinet body should be avoided as far as possible. Presently, as can be seen from FIG. 1, however, it is preferred that an inductive coupling unit 70 is present which comprises, on the one hand, a transformer winding charged by an electric energy source which is located in the switchgear cabinet body, preferably in its frame area, and a load winding which is located in the door, preferably in the area of the interlocking unit 40 which in a closed state of the door is adjacent to the charged transformer winding to achieve energy input into the load winding in a predominantly closed state of the door as effective as possible. Further, a preferred design variant consist in that locking means 40 is embodied with its unlocking mechanism for access by means of a mechanical authorization means, in particular a key, which allows access even upon failure of the electronic access authorization system and is kept in safe custody.

The access control device shown in FIG. 1 is equipped with an authentication device for checking access authorization of a person which comprises two testing stages. In a first test stage, access authorization data is checked which is sent from a transponder 20 associated with a person to central unit 10 and is received therein via a correspondingly configured receiver interface. All access authorization data stored on admitted transponders 20 is known in the authentication device of central unit 10, is for example stored therein or can be retrieved from another location, e.g. control and monitoring device 1, if necessary. Normally, identification numbers are stored in the transponder as access authorisation data, on basis of which data stored in a register of central unit 10 are queried. If the coded access authorization data is recognized to be admissible by means of comparison with data present in central unit 10 in the first testing stage, it is verified or checked, respectively, in the further testing stage whether these access authorisation data correspond to input data which was input via the input station 30 by persons carrying the relevant personal transponder 20 and which is received via an also respectively configured input interface after transmittal from central unit 10. If the input data corresponds to a predetermined code and can be associated in a predetermined manner to the optionally processed access authorization data, access authorization is eventually confirmed, and a relevant access authorization status is produced from the checking result which was recognized to be correct. Only if this status is present, the release signal is output to the relevant interlocking unit by central unit 10. If the relevant person has access authorization for several switchgear cabinets, a respectively relevant switchgear cabinet can be determined by inputting a relevant code at the input station together with the input data. The input data may thereby contain a code of alphanumerical characters.

Further, security can be increased by performing a position determination of a respective personal transponder 20 or a distance measurement by means of central station 10 and optionally provided receiver and repeater stations 60, and the release signal is emitted only if central unit 10 has determined that personal transponder 20 is also located within a predetermined or predeterminable distance range from the relevant interlocking unit or is located at a specific predetermined or predeterminable position or within a position range. Also the distance or position can be determined from the distance between transponder 20 and input station 30 or input unit 31, respectively, or even central unit 10.

A further security measure which may additionally be established in the central unit, e.g. by respective programming, consists in that an access authorization status and the release signal are produced only if a further person having a matching personal transponder 20 is present nearby and also its signal has been checked with respect to authorization and the person has been recognized as authorized. In this way, it may e.g. be ensured that a maintenance person is given access to a switchgear cabinet or the like only if a supervisor is present in its surroundings who also possesses an authorization status, which, however is not configured for access, but may contain e.g. solely a control function for an authorized person.

Personal transponder 20 may be configured as RFID-tag which is configured as an active tag for transmittal.

In connection with the access control device, an extended operation monitoring of a switchgear cabinet system and, optionally, of additional switchgear cabinets can be provided via data exchange between central station 10 and control and monitoring device for further switchgear cabinet functions, such as e.g. an air conditioning function with temperature detection and temperature control by means of cooling devices and fans and the like, an electric energy supply function with voltage and/or current monitoring and supply of electric energy, humidity sensors, smoke detectors, vibration sensors and the like. Through this data exchange it is e.g. possible to issue a respective alarm message in case of a door which was signalled to be opened by transmitting/receiving unit 50 to a remote control center or a maintenance person, respectively, and/or to control an air conditioning device such that cooling of important components is ensured, but e.g. a total cooling of a switchgear cabinet is reduced in order to avoid overloading of a cooling device. Also, less important loads may be switched off or brought in a state of lower energy demands. Further, settings of central unit 10 may be changed or supplemented via control and monitoring device 1, for example if switchgear cabinet system is provided with further cabinets or other access authorizations are issued. Also, monitoring strategies can be realized for diagnostic purposes, where programs are stored and data is deposited in control and monitoring device 1 and/or central unit 10. E.g. the frequency of access of specific persons to specific cabinets within a predetermined time period may be evaluated for diagnostic purposes. Also the purpose of access, e.g. technical maintenance or changing settings by a user via central unit 10 and, optionally connected control and monitoring device 1 may be evaluated with the aid of different personal transponders 20.

Further aspects for controlling the access authorization are e.g. automatic cancellation of authorization in case personal transponder 20 moves out of the distance range or position range or different handling of releases depending on the moving direction, moving away from or approaching of personal transponder 20.

Instead of effecting unlocking via actuation the actor unit 45 by the user upon release, also an automatic unlocking can be provided.

The invention claimed is:

1. An access control device having a central unit which is designed to wirelessly receive access authorization data stored on personal transponders, evaluate the access authorization data, and to output release signals via a wireless signal transmission link and to release a relevant interlocking unit and which has an authentication device with a testing stage in which comparison data for testing the receive access authorization data for access authorization is present, wherein, in addition, at least one input station having an input unit is present which is or can be used to establish a wireless data transmission connection to said central unit for transmission of input data that is different from the access authorization data, the authentication device is designed to operate in two stages and has a further testing stage which is designed for direct or indirect allocation of the input data to the access authorization data and to check agreement between the access authorization data and the input data with regard to the access authorization, and said central unit is designed to output the release signals when the access authorization has been established after checking by means of the further testing stage, wherein the access control device is provided with a distance measuring device for determining the distance between at least one personal transponder and at least one interlocking unit or the relevant input station or input unit and said central unit is equipped with a decision unit by means of which said release signals may be suppressed until a predetermined minimum distance is fallen below; and wherein the access control device is equipped with a position determining device for determining the position of at least one personal transponder and said central unit is provided with a decision stage by means of which said release signal may be suppressed as long as said personal transponder is located outside a predetermined area;

wherein an inductive coupling unit is provided which is effective in a closed state of a door of a switchgear cabinet and which is disposed at an interlocking unit located at the door for introducing electrical energy from said switchgear cabinet into the interlocking unit, wherein a transformer winding is located on the cabinet side in the frame which is charged by an energy source and a load winding is disposed within said interlocking unit which in a closed state of the door is located adjacent to the transformer winding.

2. The access control device of claim 1, wherein said authentication device is configured to check further authorization data of a further personal transponder and said central unit is configured to output a release signal only if also these further authorization data is recognized to be admissible.

3. The access control device of claim 1, wherein it comprises a radio transmission system with a network built up of several receiver and repeater stations.

4. The access control device of claim 1, wherein a radio transmitting/receiving unit is disposed in the area of said interlocking unit by means of which it may be determined whether a door provided with an interlocking unit is in an open or in a closed state and said state may be transmitted to said central unit.

5. The access control device of claim 1, wherein said interlocking unit is provided by a manually operable unlocking mechanism, the unlocking function thereof may be set by means of an actor unit which can be addressed by said release signal and/or which allows unlocking by means of mechanical authorization means.

6. The access control device of claim 1, wherein said interlocking unit is provided by a manually operable unlocking mechanism, the unlocking function thereof may be set by means of an actor unit which can be addressed by said release signal and/or which allows unlocking by means of a key independent of the release signal.

7. The access control device of claim 5, wherein said actor unit may be actuated piezoelectrically, electromagnetically or electromechanically.

8. The access control device of claim 1, wherein said central unit is brought in data transmittal connection with a superordinate monitoring and control device in which further control functions for monitoring switchgear cabinets, including air conditioning functions and energy supply functions, are integrated.

9. A method of access control of a switchgear cabinet system, wherein at least one of several interlocking units is addressed for unlocking with a release signal by means of a central unit if access authorization data issued from a personal transponder is received in said central unit and are recognized as authentic after verification, wherein further to said access authorization data in addition receipt data is received by an input station by means of said central unit and is checked involving said receipt data whether the access authorization data belongs to a person which is authorized for access and that an authorization status is set only if access authorization is determined by means of verification with said receipt data whereupon the release signal is issued, wherein the access control device is provided with a distance measuring device for determining the distance between at least one personal transponder and at least one interlocking unit or the input station and said central unit is equipped with a decision unit by means of which said release signals may be suppressed until a predetermined minimum distance is fallen below; and wherein the access control device is equipped with a position determining device for determining the position of at least one personal transponder and said central unit is provided with a decision stage by means of which said release signal may be suppressed as long as said personal transponder is located outside a predetermined area;

wherein an inductive coupling unit is provided which is effective in a closed state of a door of a switchgear cabinet and which is disposed at an interlocking unit located at the door for introducing electrical energy from said switchgear cabinet into the interlocking unit, wherein a transformer winding is located on the cabinet side in the frame which is charged by an energy source and a load winding is disposed within said interlocking unit which in a closed state of the door is located adjacent to the transformer winding.

* * * * *